United States Patent
Gopinathan et al.

(10) Patent No.: US 9,934,218 B2
(45) Date of Patent: Apr. 3, 2018

(54) SYSTEMS AND METHODS FOR EXTRACTING ATTRIBUTES FROM TEXT CONTENT

(75) Inventors: Madhu Gopinathan, Bangalore (IN); Sarbendu Guha, Bangalore (IN); Indranil Basu, Bangalore (IN); Nikhil Menon, Bangalore (IN); Tejas Prabhakara Sampige, Bangalore (IN)

(73) Assignee: Infosys Limited, Bangalore (IN)

( * ) Notice: Subject to any disclaimer, the term of this patent is extended or adjusted under 35 U.S.C. 154(b) by 604 days.

(21) Appl. No.: 13/450,435

(22) Filed: Apr. 18, 2012

(65) Prior Publication Data
US 2013/0144604 A1 Jun. 6, 2013

(30) Foreign Application Priority Data
Dec. 5, 2011 (IN) .......................... 4197/CHE/2011

(51) Int. Cl.
G06F 17/00 (2006.01)
G06F 17/27 (2006.01)

(52) U.S. Cl.
CPC ...... G06F 17/2775 (2013.01); G06F 17/2785 (2013.01)

(58) Field of Classification Search
USPC .... 704/1–8, 9–10, 1–10, 251–257, 270–277, 704/E13.001–E13.014
See application file for complete search history.

(56) References Cited

U.S. PATENT DOCUMENTS

| | | | | | |
|---|---|---|---|---|---|
| 5,519,608 | A | * | 5/1996 | Kupiec | G06F 17/3064 704/9 |
| 5,610,812 | A | * | 3/1997 | Schabes | G06F 17/274 704/4 |
| 5,642,519 | A | * | 6/1997 | Martin | G10L 15/1822 704/255 |
| 5,721,939 | A | * | 2/1998 | Kaplan | G06F 17/277 704/1 |
| 5,794,177 | A | * | 8/1998 | Carus et al. | 704/9 |

(Continued)

OTHER PUBLICATIONS

Embley, et al., "Ontology-Based Extraction and Structuring of Information from Data-Rich Unstructured Documents," Proceedings of the seventh international conference on Information and knowledge management, pp. 52-49, 1998.*

*Primary Examiner* — Fariba Sirjani
(74) *Attorney, Agent, or Firm* — Klarquist Sparkman, LLP

(57) ABSTRACT

Systems and method for extracting attributes from text content are described. Example embodiments may include a computer implemented method for extracting attributes from text data, wherein the text data is obtained from at least one information source. As described, the implementation may include receiving, from a user, an address for the at least one information source and an attribute name, creating a tagged information file by associating a part of speech tag to text data obtained from the at least one information source, identifying a location of the attribute name in the tagged information file using an approximate text matching technique and determining at least one attribute descriptor from the tagged information file wherein the tagged information file is parsed based on a part of speech tag associated with the attribute name to determine a conclusion of the attribute descriptor.

19 Claims, 4 Drawing Sheets

(56) References Cited

U.S. PATENT DOCUMENTS

| | | | | |
|---|---|---|---|---|
| 5,890,103 | A * | 3/1999 | Carus | G06F 17/274 704/8 |
| 6,125,362 | A * | 9/2000 | Elworthy | G06F 17/275 |
| 6,202,064 | B1 * | 3/2001 | Julliard | G06F 17/30663 |
| 6,243,679 | B1 * | 6/2001 | Mohri | G10L 15/193 704/10 |
| 6,424,983 | B1 * | 7/2002 | Schabes et al. | 715/257 |
| 6,470,306 | B1 * | 10/2002 | Pringle et al. | 704/3 |
| 6,505,157 | B1 * | 1/2003 | Elworthy | G06F 17/277 704/255 |
| 6,810,375 | B1 * | 10/2004 | Ejerhed | 704/9 |
| 6,937,975 | B1 * | 8/2005 | Elworthy | G06F 17/2785 704/9 |
| 6,980,949 | B2 * | 12/2005 | Ford | G06F 17/277 704/10 |
| 7,389,224 | B1 * | 6/2008 | Elworthy | G06F 17/30678 704/9 |
| 7,627,551 | B2 * | 12/2009 | Morgan | G06F 19/3443 |
| 7,711,736 | B2 * | 5/2010 | Levin | G06F 17/30616 707/737 |
| 7,814,048 | B2 * | 10/2010 | Zhou | G06F 17/30705 702/1 |
| 7,996,440 | B2 * | 8/2011 | Probst | G06F 17/2745 704/275 |
| 8,601,015 | B1 * | 12/2013 | Wolfram | G06F 17/3064 707/759 |
| 9,009,590 | B2 * | 4/2015 | Todhunter | G06F 17/2785 715/256 |
| 9,069,814 | B2 * | 6/2015 | Wolfram | G06F 17/30401 |
| 9,268,878 | B2 * | 2/2016 | Bieniosek | G06F 17/30707 |
| 9,684,721 | B2 * | 6/2017 | Wolfram | G06F 17/30864 |
| 2003/0088562 | A1 * | 5/2003 | Dillon | G06F 17/3061 |
| 2004/0167885 | A1 * | 8/2004 | Wakefield | G06F 17/30569 |
| 2005/0108001 | A1 * | 5/2005 | Aarskog | 704/10 |
| 2007/0112764 | A1 * | 5/2007 | Yih et al. | 707/5 |
| 2007/0203693 | A1 * | 8/2007 | Estes | G06N 5/022 704/9 |
| 2008/0104542 | A1 * | 5/2008 | Cohen | G06F 17/30864 715/810 |
| 2009/0228428 | A1 * | 9/2009 | Dan | G06F 17/30997 |
| 2010/0299347 | A1 * | 11/2010 | Greenberg | G06F 17/30893 707/769 |
| 2011/0161067 | A1 * | 6/2011 | Lesher et al. | 704/1 |
| 2011/0307435 | A1 * | 12/2011 | Overell et al. | 706/46 |
| 2012/0089620 | A1 * | 4/2012 | Castellanos et al. | 707/749 |
| 2012/0290288 | A1 * | 11/2012 | Ait-Mokhtar | G06F 17/271 704/9 |
| 2013/0144604 | A1 * | 6/2013 | Gopinathan et al. | 704/9 |

* cited by examiner

SYSTEMS AND METHODS FOR EXTRACTING ATTRIBUTES FROM TEXT CONTENT

RELATED APPLICATION DATA

This application claims priority to Indian Patent Application No. 4197/CHE/2011, filed Dec. 5, 2011, which is hereby incorporated by reference in its entirety.

FIELD

The invention relates generally to the extraction of attribute values from structured or unstructured text data. More specifically, the invention relates to the extraction of attribute values from English text data by means of grammatical context detection techniques.

BACKGROUND

Since the advent of large scale and persistent storage and compute capabilities across homes, corporations, and government, large amounts of text data can be, and have been, stored with few barriers to retrieval or dispersal. The ability to extract information from text data has, as a consequence, assumed increasing significance. Applications that use forms of text mining may be found in fields ranging from business intelligence solutions to academics, being used for analysis of patent and academic literature, indexing, clustering, and search and information extraction.

Existing techniques in the field of text mining, or value extraction from a set of text data may involve supervised or unsupervised machine-learning methods. However, the extraction of exact attribute values from unstructured data is still a grey area, with the most accurate methods dependent on a large amount of user input, or training data. In order to circumvent such a requirement, or augment accuracy, some existing methods may additionally use classification techniques upon the dataset. However, data classification techniques carry with them a significant risk of ignoring some data which may, in turn, contain valid values of attributes in the text.

What is needed, then, is a reliable and accurate off-the-shelf solution for attribute or value extraction from text data that is able to work without any need for sample input or training. It is additionally important that any such solution be domain independent, and capable of functioning on structured or unstructured text in any domain.

SUMMARY OF THE INVENTION

Embodiments of the present invention include systems and methods for the extraction of attribute values from English text data by means of context detection techniques.

Embodiments of the invention described include a computer implemented method for determining at least one attribute descriptor of an attribute from text data, wherein the text data is obtained from at least one information source. The method may comprise receiving, from a user, an address for the at least one information source, and an attribute name. It may further include creating a tagged information file by associating a part of speech tag to text data obtained from the at least one information source, identifying a location of the attribute name in the tagged information file using an approximate text matching technique, and determining at least one attribute descriptor from the tagged information file that precedes the attribute name, and at least one attribute descriptor that succeeds the attribute name, wherein the tagged information file is parsed based on the associated part of speech tags to determine a conclusion of the at least one attribute descriptor.

In a further embodiment, a system for determining at least one attribute descriptor of an attribute from text data is described. Text data, in accordance with the embodiment, is obtained from at least one information source. Additionally, the system may comprise a user interface for receiving, from a user, an address for the at least one information source, and an attribute name; a tag generating module for creating a tagged information file by associating part of speech tags to the text data obtained from the at least one information source; an identifying module for identifying location of the attribute name in the tagged information file using approximate text matching techniques; and a processing module for determining at least one attribute descriptor from the tagged information file that is preceding and succeeding the attribute name, wherein the tagged information file is parsed, based on the associated part of speech tags, to determine a conclusion of the at least one attribute descriptor.

DRAWINGS

These and other features, aspects, and advantages of the present invention will be better understood when the following detailed description is read with reference to the accompanying drawings in which like characters represent like parts throughout the drawings, wherein.

While systems and methods are described herein by way of example and embodiments, those skilled in the art recognize that systems and methods for extracting attributes from text content are not limited to the embodiments or drawings described. It should be understood that the drawings and description are not intended to be limiting to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "may" is used in a permissive sense (i.e., meaning having the potential to) rather than the mandatory sense (i.e., meaning must). Similarly, the words "include", "including", and "includes" mean including, but not limited to.

DETAILED DESCRIPTION

The following description is the full and informative description of the best method and system presently contemplated for carrying out the present invention which is known to the inventors at the time of filing the patent application.

The present invention relates to the extraction of attribute values or features from unstructured or structured text data.

The operation of one or more embodiments disclosed may be domain independent, and can thus be used for value/feature extraction for any text data containing explicit or implicit descriptions of item-value or item-feature information. In accordance with one or more embodiments, accurate results may be produced by means of solely an attribute name, or its synonyms, where the attributes are provided by a user. In contrast, some present technologies may rely on a machine-learning based approach that requires a 'training set' of data for calibration before reaching an optimal performance state. Further, in a present implementation, performance may be further enhanced with the acceptance of additional input such as sentence delimiters, value separators, or attribute separators.

Figure 1:
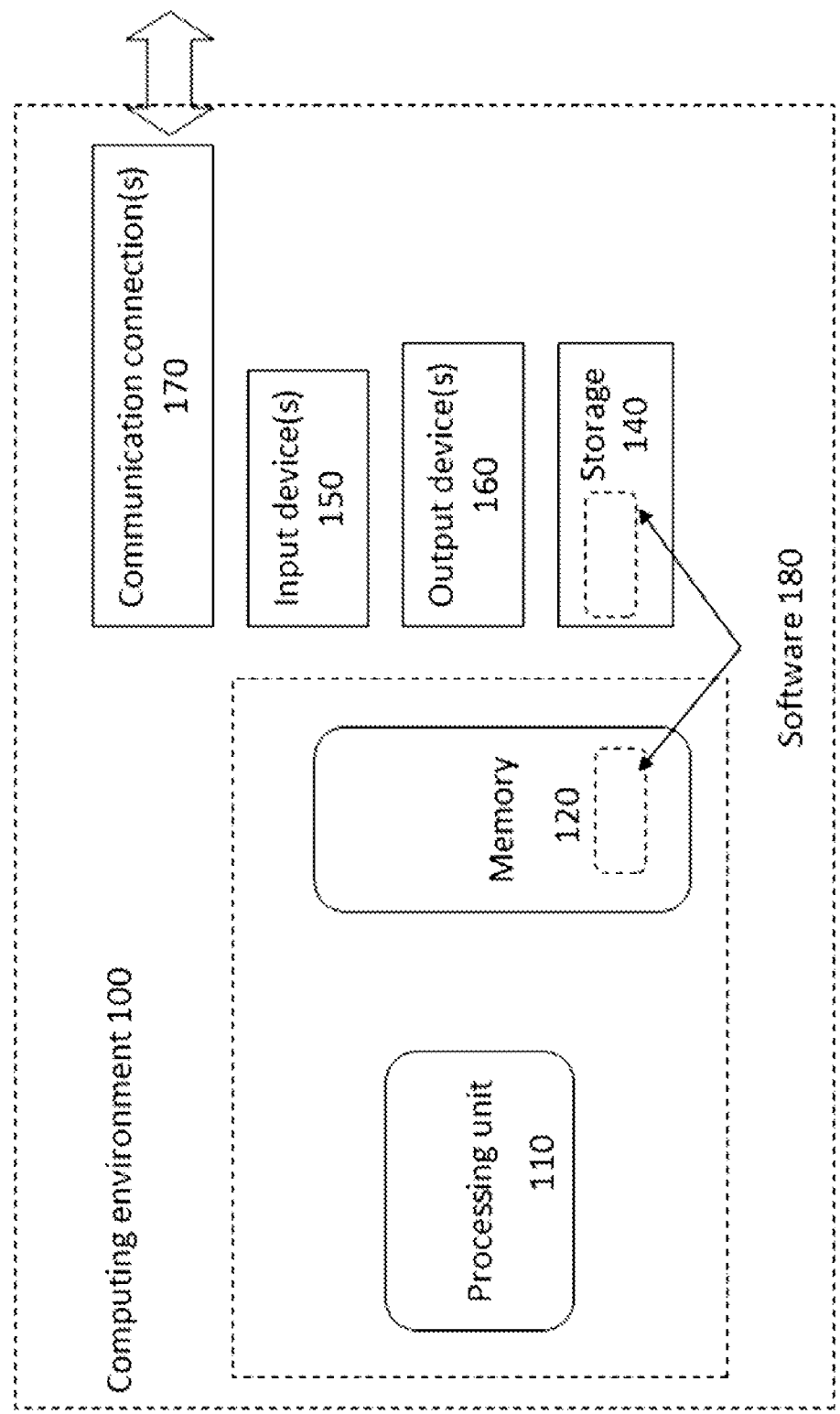
FIG. 1 is an illustrative architecture diagram of a computing environment in which a service level agreement is derived.

The implementation environment for the extraction of attributes from text content is further detailed with reference to FIG. 1, wherein a computing environment 100 where an embodiment of the invention disclosed may be executed, is depicted. The computing environment may comprise a processing unit 110, a communication connection 170, an input device 150, an output device 160, and a processor readable storage medium 140, in operable communication with the processing unit 110. The computing environment may run a software 180, the software 180 stored on the computer readable storage medium, and consisting of one or more programming instructions stored in the processor readable storage medium, the programming instructions suitable for implementing the extraction of attributes from text data in accordance with one or more embodiments of the presently disclosed invention.

Figure 2:
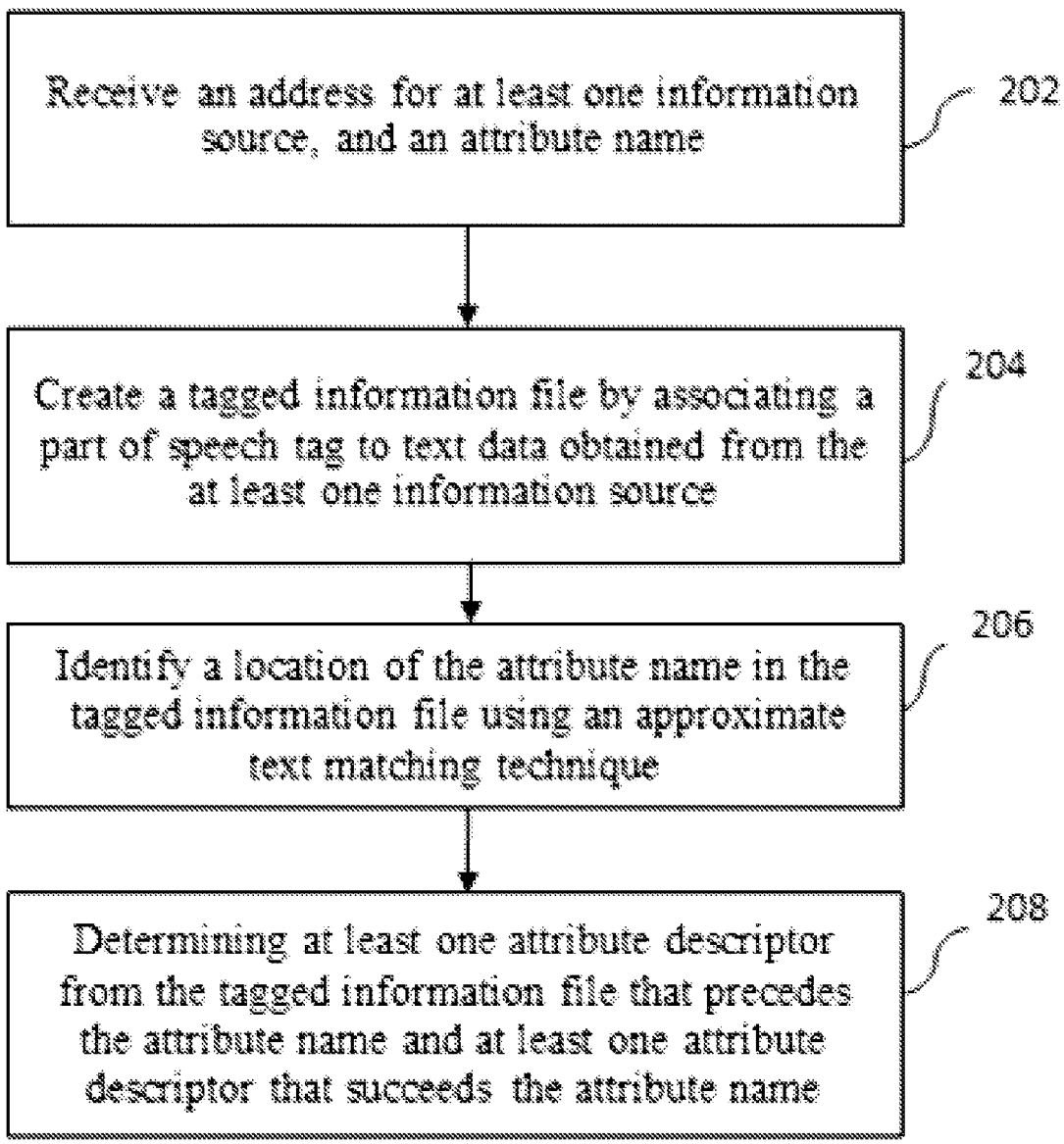
FIG. 2 is an illustrative flow diagram depicting a method of extracting attributes from text data in accordance with an embodiment of the present invention.

Referring now to FIG. 2, a first step in the extraction of an attribute from text based data, as in 202, involves receiving an address for at least one information source, and an attribute name. The address specified may be a URL address, or the address to text data, such as a text file, located on a local data storage resource associated with the system on which the embodied method is executed.

In a further step, 204, a tagged information file may be created by associating a part of speech tag to text data obtained from the at least one information source. In a further step, 206, a location of the attribute name in the tagged information file may be identified using an approximate text matching technique. An approximate string matching technique may be employed instead of an exact string matching technique in order to account for possible discrepancies in the text provided.

The text matching technique used may be based on a grammatical context based detection mechanism. Grammatical context based detection may be used for attribute-value extraction, in contrast to machine learning techniques. More specifically, the operation of some embodiments may rely on the detection of a context sensitive region pertaining to an attribute in an input body of text data, based on the structure and rules of written English grammar. The size of this region or 'window' chosen may be context sensitive and not of a fixed size. A shift in context may be detected based on a part of speech associated with words before and after the attribute, and consequently, the text matching technique employed may automatically detect single as well as multi-valued/multi-feature attribute values.

While the operations disclosed are effective on unstructured text data, they may be applied to structured data as well, thereby rendering such operation independent of text structure.

The notation and meaning of the different tags that are each associated with a particular part of speech that make up the tagged information file, and thereby form, as a whole, a basis for detection of a shift in context, is depicted in Table 1.

TABLE 1

| POS TAG | DESCRIPTION |
|---|---|
| CC | Coordinating conjunction |
| CD | Cardinal number |
| DT | Determiner |
| FW | Foreign word |
| IN | Preposition or subordinating conjunction |
| JJ | Adjective |
| JJR | Adjective, comparative |
| JJS | Adjective, superlative |
| NN | Noun, singular or mass |
| NNP | Proper noun, singular |
| NNS | Noun, plural |
| SYM | Symbol |
| TO | To |
| VB | Verb, base form |
| VBG | Verb, gerund or present participle |
| VBN | Verb, past participle |
| RRB | Ending parentheses, ) |
| RCB | Ending Brace, } |
| LRB | Beginning parentheses, ( |
| LCB | Beginning Brace, { |

In a further step, 208, at least one attribute descriptor from the tagged information file that precedes the attribute name and at least one attribute descriptor that succeeds the attribute name are determined. The determination of at least one attribute descriptor from the tagged information file may be described with reference to a finite machine model.

Figure 3A:
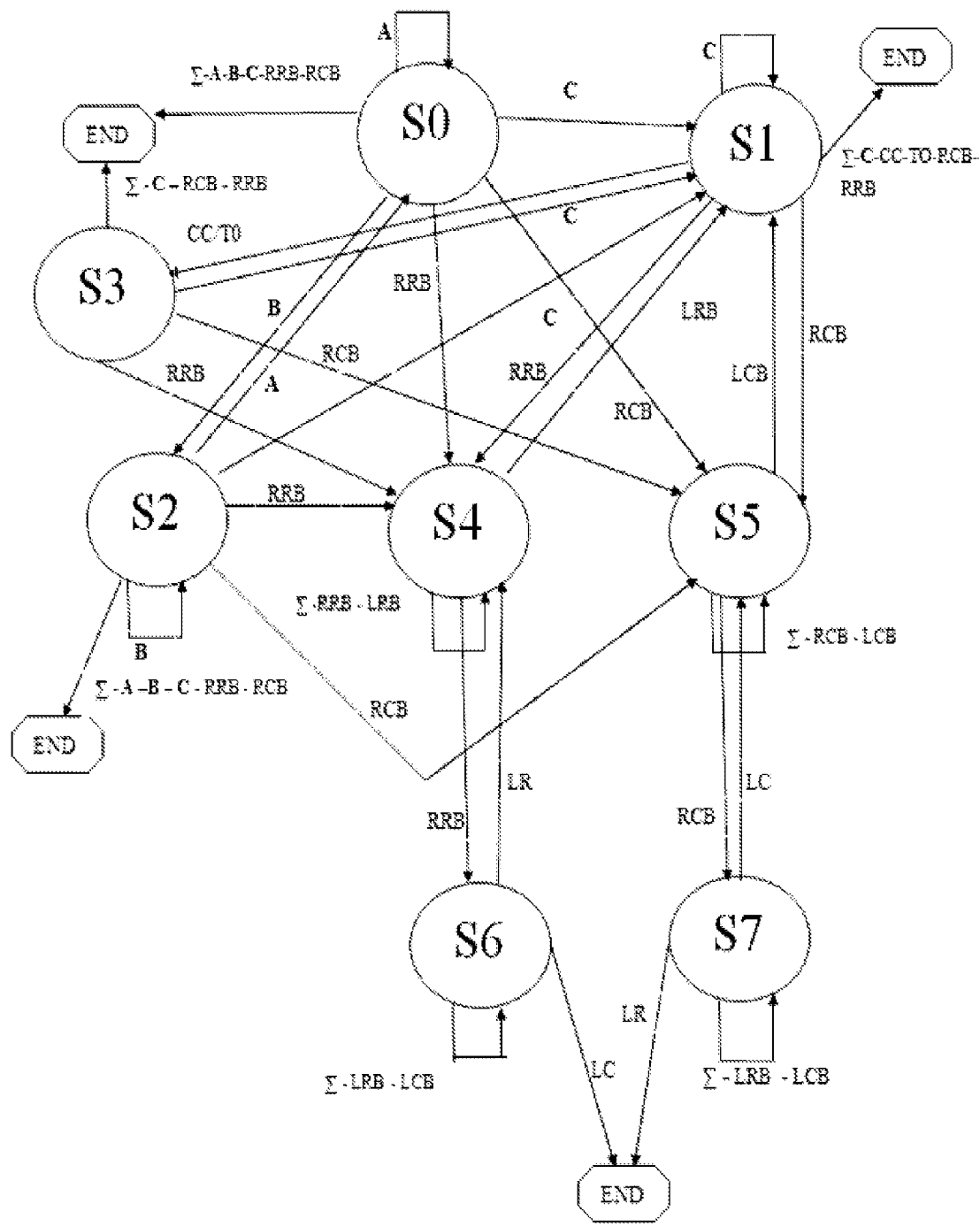
FIG. 3a is an illustrative model depicting the operation of an approximate text matching technique, in accordance with an embodiment of the invention.

Referring firstly to the state diagram of FIG. 3a, the detection of context switches preceding the attribute to be extracted is described. Firstly, the one or more part of speech tags of table 1 are classified into four sets in accordance with Table 2.

TABLE 2

| Set A | NN/NNP/NNS |
|---|---|
| Set B | IN/CC/DT/VBG/VBN/TO |
| Set C | FW/CD/JJ/JJR/JJS/SYM |
| Σ | Universal set of all POS (Parts of Speech) |

The initial state of the finite state machine (FSM) is indicated by S0, or state 0, of FIG. 3a. When an attribute specified is encountered, the FSM may reach this state. From this state, if a word within set A (Singular Noun, Proper Singular Noun, Plural Noun) is encountered as a state transition input, the FSM may retain its state, i.e. no state transition happens. In this state, FSM may accept any of a variety of inputs, except predefined delimiters, such as the characters ';' or '.'. Encountering a delimiter may cause the FSM to transition to an end state.

Secondly, state S1, as in FIG. 3a, may be reached by the FSM from S0 when any word or token belonging to Set C is received as input to S0. Therefore, S1 may be considered an "Adjective or Value" based state. If a token from Set C repeats, the FSM remains in the same state. From S1, receiving an input tag 'CC', or an input tag 'TO' may cause the FSM to transition to S3.

Third, S2, as in FIG. 3a, may be reached by the FSM from S0 or from S1 when any word/token belonging to Set B is received as input to S0. Therefore, S2 may be described as a "Verb or Conjunction" based state. If a token from Set B repeats, the FSM may remain in the same state. If a word from Set A is received as input, the FSM may return to S0 which is the initial state. If any other input is encountered, the FSM may transition to an end state, and terminate. This state, then, may serve to provide an association between various value and descriptions of the attribute.

Fourth, S3, as in FIG. 3a, may be reached by the FSM from S1 when the defined part of speech tags 'CC' or 'TO' are received as input to S1. S3, then, may be described as being a "description of join" between an attributes and its features. No input may cause S3 to iterate. Additionally, a word from Set C may take the FSM to S1 from this state. Any other input may bring the FSM to an end or terminating state. S3 is thus a short-lived intermediate state.

Fifth, state S4, as in FIG. 3a. Receiving an ending parentheses, i.e. ")" from any state can bring the FSM into this state. It may remain within this state unless a beginning parentheses, i.e. "(" is received as input. When a beginning parenthesis is received, the FSM reaches S1, thereby taking the group of words within parentheses as an Adjective or Value. On receiving another ")", the FSM may transition to a nested parentheses state, which is S6. With any other word, the FSM may remain in S4.

Sixth, S5, as in FIG. 3a. Receiving an ending brace, i.e. "}" from any state may bring the FSM into this state. It remains within this state until the beginning brace, i.e. "{" comes as input. With beginning parentheses FSM reaches S1 thereby taking the group of words within parentheses as Adjective or Value. With another "}", FSM will go to nested brace state which is S7. With any other word, FSM remains in S5.

Seventh, S6, as in FIG. 3a, is a nested parentheses state, i.e. if the FSM is already in the single parentheses state, i.e. S4, then another ending parentheses, i.e. ")" brings the FSM to state S6. From this, one beginning parenthesis, i.e. "(" may cause the FSM to transition to S4. However, receiving an ending brace in this state may cause a bracket mismatch error, thereby terminating the operation of the FSM. This is because the mismatching of brackets is treated as incorrect English syntax. Receiving any other word may cause the FSM to retain S6.

Eighth, S7, as in FIG. 3a, is a nested brace State, i.e. if the FSM is already in a single brace state, i.e. S5 above, then another ending brace, i.e. "}" may cause the FSM to transition to this state. From this, a further beginning brace, i.e. "{" may cause the FSM to transition to S5. But, if, instead, an ending parenthesis is received, it means mismatching of brackets, thereby terminating FSM. Mismatching of brackets is treated as wrong English syntax. Any other word keeps the FSM in the S7.

Figure 3B:
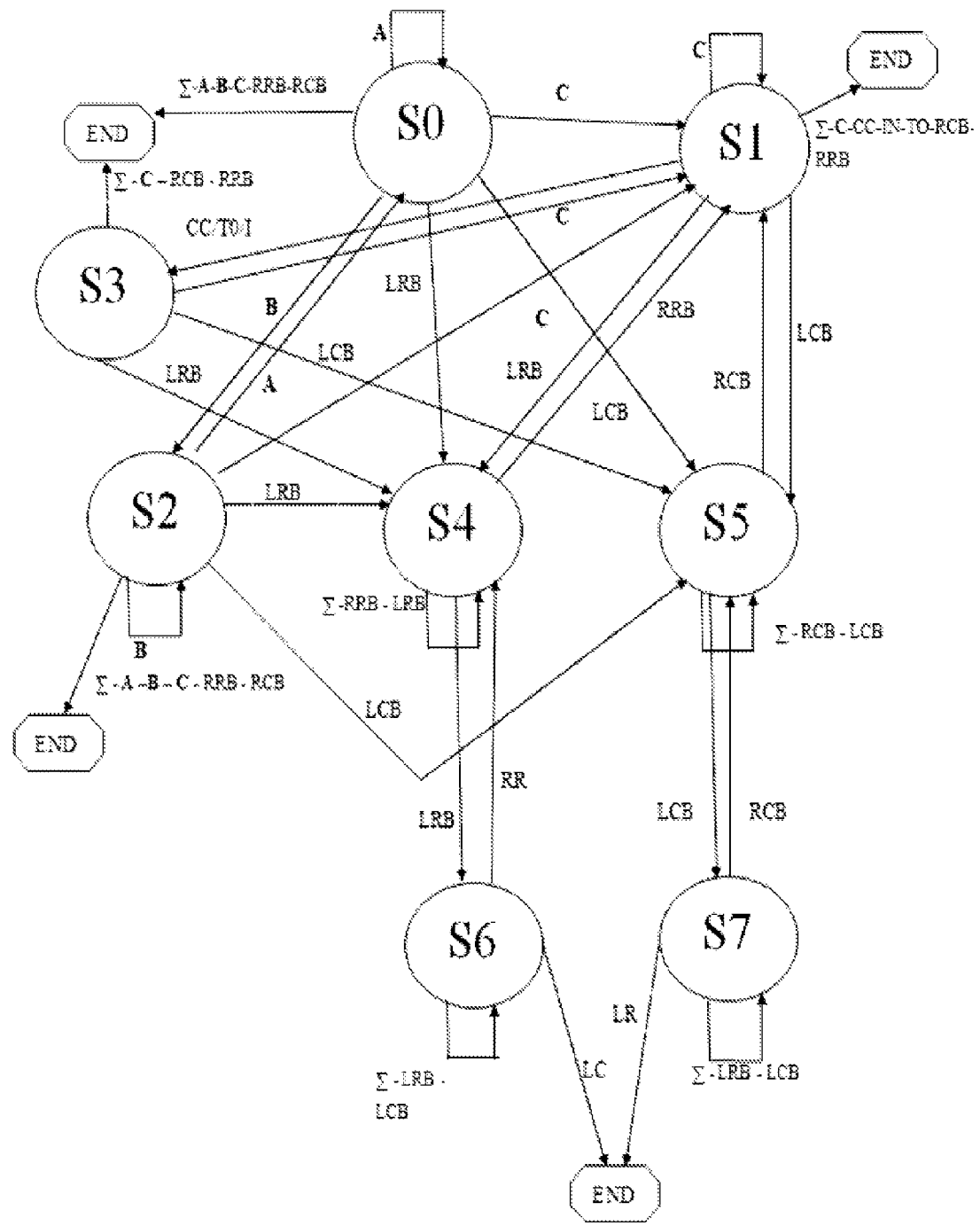
FIG. 3b is an illustrative model depicting the operation of an approximate text matching technique, in accordance with an embodiment of the invention.

In accordance with the embodiment described, and referring to the state diagram of FIG. 3b, the detection of context switches succeeding the attribute to be extracted is described. Firstly, the one or more part of speech tags of Table 1 are classified into four sets in accordance with Table 2.

A detailed description of these states is as follows:

The initial state of the finite state machine (FSM) is indicated by S0, or state 0, of FIG. 3b. When an attribute specified is encountered, the FSM may reach this state. From this state, if a word within set A (Singular Noun, Proper Singular Noun, Plural Noun) is encountered as a state transition input, the FSM may retain its state, i.e. no state transition happens. In this state, FSM may accept any of a variety of inputs, except predefined delimiters, such as the characters ';' or '.'. Encountering a delimiter may cause the FSM to transition to an end state.

Secondly, state S1, as in FIG. 3b, may be reached by the FSM from S0 when any word or token belonging to Set C is received as input to S0. Therefore, S1 may be considered an "Adjective or Value" based state. If a token from Set C repeats, the FSM remains in the same state. From S1, receiving an input 'CC', or an input 'TO' may cause the FSM to transition to S3.

Third, S2, as in FIG. 3b, may be reached by the FSM from S0 or from S1 when any word/token belonging to Set B is received as input to S0. Therefore, S2 may be described as a "Verb or Conjunction" based state. If a token from Set B repeats, the FSM may remain in the same state. If a word from Set A is received as input, the FSM may return to S0 which is the initial state. If any other input is encountered, the FSM may transition to an end state, and terminate. This state, then, may serve to provide an association between various value and descriptions of the attribute.

Fourth, S3, as in FIG. 3b, may be reached by the FSM from S1 when the defined part of speech tags 'CC' or 'TO' are received as input to S1. S3, then, may be described as being a "description of join" between an attributes and its features. No input may cause S3 to iterate. Additionally, a word from Set C may take the FSM to S1 from this state. Any other input may bring the FSM to an end or terminating state. S3 is thus a short-lived intermediate state.

Fifth, state S4, as in FIG. 3b. Receiving a beginning parentheses, i.e. "(" from any state can bring the FSM into this state. It may remain within this state unless an ending parentheses, i.e. ")" is received as input. When an ending parenthesis is received, the FSM reaches S1, thereby taking the group of words within parentheses as an Adjective or Value. On receiving another "(", the FSM may transition to a nested parentheses state, which is S6. With any other word, the FSM may remain in S4.

Sixth, S5, as in FIG. 3b. Receiving a beginning brace, i.e. "{" from any state may bring the FSM into this state. It remains within this state until the ending brace, i.e. "}" comes as input. With an ending parenthesis, the FSM reaches S1, taking the group of words within parentheses as an Adjective or Value. With another "{", FSM will go to nested brace state which is S7. With any other word, FSM remains in S5.

Seventh, S6, as in FIG. 3b, is a nested parentheses state, i.e. if the FSM is already in the single parentheses state, i.e. S4, then another beginning parentheses, i.e. "(" brings the FSM to state S6. From this, one ending parenthesis, i.e. ")" may cause the FSM to transition to S4. However, receiving a beginning brace in this state may cause a bracket mismatch error, thereby terminating the operation of the FSM. This is because the mismatching of brackets is treated as incorrect English syntax. Receiving any other word may cause the FSM to retain S6.

Eighth, S7, as in FIG. 3b, is a nested brace state, i.e. if the FSM is already in a single brace state, i.e. S5 above, then another beginning brace, i.e. "{" may cause the FSM to transition to this state. From this, a further ending brace, i.e. "}" may cause the FSM to transition to S5. But, if, instead, an ending parenthesis is received, a mismatching of brackets is registered, thereby terminating the FSM. The mismatching of brackets is treated as wrong English syntax. Any other word keeps the FSM in the S7.

Additionally, in some embodiments, a report containing one or more attributes or values extracted from the input text data may be generated. This is illustrated, along with an example operation of the context based matching method implemented in accordance with one or more described embodiments, by means of the below table, Table 3.

TABLE 3

| Term | Extracted Description | Text |
|---|---|---|
| LCD | 3" indoor/outdoor color | 3x optical/5x digital zoom; 3" indoor/outdoor color LCD; digital image stabilization; face detection technology; PictBridge-enabled |
| LCD | 2.5" Intelligent | 3x optical/3x digital zoom; 2.5" Intelligent LCD display; face detection technology; digital image stabilization |
| LCD | 3.0-inch, 230,000-dot High-resolution | Stylish as it is, the DMC-FP3S 14 Megapixel Lumix Digital Camera shoots ultra hi-res stills and 1280 × 720 HD movies for flexibility anytime and anywhere. Venus Engine IVAdvanced Signal Processing Extended Battery Life - Approx. 300 Shots on a Single Battery Charge Unlimited Consecutive Shooting iA (Intelligent Auto) Mode Intelligent Scene Selector - Scene Detection MEGA O.I.S. (Optical Image Stabilizer) - Shake Detection Intelligent ISO Control - Motion Detection Face Detection AF/AE - Face Detection Auto Backlight Compensation HD Movie Recording (1,280 × 720 pixels at 30 fps in Motion JPEG Format) 3.0-inch, 230,000-dot High-resolution LCD Intelligent LCD |

The present description includes the best presently contemplated method for carrying out the present invention. Various modifications may be readily apparent to those skilled in the art and some features of the present invention may be used without the corresponding use of other features. Accordingly, the present invention is not intended to be limited to the embodiments shown but is to be accorded the widest scope consistent with the principles and features described herein.

As will be appreciated by those ordinary skilled in the art, the aforementioned example, demonstrations, and method steps may be implemented by suitable code on a processor base system, such as general purpose or special purpose computer. It should also be noted that different implementations of the present technique may perform some or all the steps described herein in different orders or substantially concurrently, that is, in parallel. Furthermore, the functions may be implemented in a variety of programming languages. Such code, as will be appreciated by those of ordinary skilled in the art, may be stored or adapted for storage in one or more tangible machine readable media, such as on memory chips, local or remote hard disks, optical disks or other media, which may be accessed by a processor based system to execute the stored code.

What is claimed is:

1. A method implemented by one or more computers for extracting one or more descriptors from text data associated with a specified term in the text data, the method comprising:
   receiving, by at least one of the one or more computers, the text data;
   receiving, by at least one of the one or more computers, the specified term to be located in the text data, the specified term being at least one word;
   creating, by at least one of the one or more computers, a tagged information file by associating part of speech tags to words in the text data, including any descriptors present in the text data, wherein a descriptor comprises one or more words of the text data that succeed or precede the specified term;
   identifying, by at least one of the one or more computers, a location of the specified term in the tagged information file using an approximate text matching technique, wherein the approximate text matching technique:
   detects the specified term grouped together with the descriptors of the specified term in the text data using the tagged information file, the specified term grouped together with the descriptors of the specified term forming a variable region or variable window that is context sensitive and not of a fixed size; and
   identifies, through a finite state machine, a grammatical context shift in the context sensitive region pertaining to the specified term in the text data by analyzing the part of speech tags of the tagged information file, wherein the grammatical context shift is indicated by an autonomous transition of the finite state machine from a first state associated with a first part of speech tag of the tagged information file to a second state associated with a second part of speech tag of the tagged information file for parts of speech associated with words before and after the specified term;
   determining based on the determined grammatical context shift, by at least one of the one or more computers, the one or more descriptors of the specified term;
   extracting, by at least one of the one or more computers, the one or more descriptors of the specified term from the text data; and
   providing, by at least one of the one or more computers, a report comprising the extracted one or more descriptors of the specified term.

2. The method of claim 1, wherein the text data is structured.

3. The method of claim 1, wherein the text data is unstructured.

4. The method of claim 1, wherein the text data is received from a specified information source, the information source comprising a website on the Internet, a text data repository, or text on the Intranet of an organization.

5. The method of claim 1, wherein determining the one or more descriptors comprises:
   storing at least one first string before an attribute name in the tagged information file until a word having a part of speech tag belonging to a reference group is determined.

6. The method of claim 1, wherein the first and second part of speech tags are associated with adjacent words.

7. A system for extracting one or more descriptors from text data for a specified term in the text data, wherein the text data is obtained from at least one information source, the system comprising:
   a user interface configured to receive, from a user:
      an address for the at least one information source, the address being a uniform resource locator (URL) address or a location of a text file within a storage device, the term being at least one word to be located in the text data; and
      the specified term; and
   at least one hardware processor operatively coupled to a memory and a non-transitory storage storing instructions which when executed by at least one of the processors cause the at least one hardware processor to:
      generate a tagged information file by associating part of speech tags to the text data obtained from the at least one information source, including any descriptors present in the text data, wherein a descriptor comprises one or more words of the text data that succeed or precede the specified term;
      identify a location of the specified term in the tagged information file using an approximate text matching technique, wherein the approximate text matching technique:

detects the specified term grouped together with the descriptors of the specified term in the text data using the tagged information file, the specified term grouped together with the descriptors of the specified term forming a variable region or variable window that is context sensitive and not of a fixed size; and;

identifies, through a finite state machine, a grammatical context shift in the context sensitive region pertaining to the specified term in the text data by analyzing the part of speech tags of the tagged information file, wherein the grammatical context shift is indicated by an autonomous transition of the finite state machine from a first state associated with a first part of speech tag of the tagged information file to a second state associated with a second part of speech tag of the tagged information file for parts of speech associated with words before and after the specified term;

determine based on the grammatical context shift the one or more descriptors of the specified term;

extract the one or more descriptors of the specified term from the text data; and return the one or more extracted descriptors of the specified term.

8. The system of claim 7, wherein the text data is structured.

9. The system of claim 7, wherein the text data is unstructured.

10. The system of claim 7, wherein the at least one information source is a URL address.

11. The system of claim 7, wherein the processor module is further configured to:

store at least one first string before the term in the text data in the tagged information file when the associated part of speech tag associated with a word of the at least one first string belongs to a first group until a word having a part of speech tag belonging to a second group is determined.

12. The system of claim 11, further comprising a report generation module configured to generate a report comprising the extracted at least one descriptor of the specified term.

13. The system of claim 7, wherein the instructions further cause the at least one hardware processor to store at least one first string before the specified term in the tagged information file until a word having a part of speech tag belonging to a second set is determined.

14. A non-transitory computer readable medium comprising a plurality of computer-executable instructions stored thereon that, when executed, cause a computing system to perform processing for extracting one or more descriptors of a specified term in text data from the text data, the processing comprising:

receiving, from a user:
an address for at least one information source, the address being a uniform resource locator (URL) address or a location of a text file within a storage device, the term being at least one word or other text token; and
the specified term;

creating a tagged information file by associating part of speech tags to text data obtained from the at least one information source, including to any descriptors present in the text data, wherein a descriptor comprises one or more words of the text data that succeed or precede the specified term;

identifying a location of the specified term in the tagged information file using an approximate text matching technique, wherein the approximate text matching technique:

detects the specified term grouped together with the descriptors of the specified term in the text data using the tagged information file, the specified term grouped together with the descriptors of the specified term forming a variable region or variable window that is context sensitive and not of a fixed size; and identifies, through a finite state machine, a grammatical context shift in the context sensitive region pertaining to the specified term in the text data by analyzing the part of speech tags of the tagged information file, wherein the grammatical context shift is indicated by an autonomous transition of the finite state machine from a first state associated with a first part of speech tag of the tagged information file to a second state associated with a second part of speech tag of the tagged information file for parts of speech associated with words before and after the specified term;

determining based on the determined grammatical context shift the one or more descriptors of the specified term;

extracting the one or more descriptors of the specified term from the text data; and providing a report comprising the extracted one or more descriptors of the specified term.

15. The non-transitory computer readable medium of claim 14, wherein the input text data is structured.

16. The non-transitory computer readable medium of claim 14, wherein the input text data is unstructured.

17. The non-transitory computer readable medium of claim 14, wherein the at least one information source is a URL.

18. The non-transitory computer readable medium of claim 14, wherein determining the one or more descriptors comprises storing at least one first string before an attribute name in the tagged information file until a word or other text token having a part of speech tag belonging to a second set is determined.

19. The non-transitory computer readable medium of claim 14, wherein the first and second part of speech tags are associated with adjacent words.

* * * * *